United States Patent
Ludwig et al.

(10) Patent No.: US 6,749,313 B2
(45) Date of Patent: Jun. 15, 2004

(54) PLATE-TYPE LUMINAIRE

(75) Inventors: Alexander Ludwig, Heinrichshofen (DE); Rudolf Rieger, Mering (DE); Tibor Csizy, Mering (DE)

(73) Assignee: Ludwig Leuchten KG (DE)

( * ) Notice: Subject to any disclaimer, the term of this patent is extended or adjusted under 35 U.S.C. 154(b) by 150 days.

(21) Appl. No.: 10/347,848

(22) Filed: Jan. 16, 2003

(65) Prior Publication Data

US 2003/0133285 A1 Jul. 17, 2003

(30) Foreign Application Priority Data

Jan. 17, 2002 (DE) ......................... 102 01 556

(51) Int. Cl.⁷ ................................. F21V 8/00
(52) U.S. Cl. ........................ 362/31; 362/340
(58) Field of Search .................. 362/31, 26, 339, 362/340

(56) References Cited

U.S. PATENT DOCUMENTS

| 6,247,826 B1 | 6/2001 | Funamoto et al. ............ 362/31 |
| 6,332,690 B1 * | 12/2001 | Murofushi .................. 362/31 |
| 6,356,389 B1 * | 3/2002 | Nilsen et al. ............... 359/625 |

FOREIGN PATENT DOCUMENTS

| DE | 4205137 | 8/1993 |
| EP | 0495273 | 9/1996 |
| EP | 0751340 | 1/1997 |
| EP | 0940625 | 9/1999 |
| EP | 1055870 | 11/2000 |
| EP | 1059484 | 12/2000 |
| EP | 1085252 | 3/2001 |
| EP | 1106905 | 6/2001 |
| JP | 2001-176315 | 6/2001 |

OTHER PUBLICATIONS

German Search Report.
European Search Report EP 02 02 5867 dated Jan. 22, 2003.

* cited by examiner

Primary Examiner—Laura K. Tso
(74) Attorney, Agent, or Firm—Ostrolenk, Faber, Gerb & Soffen, LLP

(57) ABSTRACT

Plate-type luminaire comprising a prism plate with a smooth upper plate surface and a prism lower surface formed by a plurality of longitudinal ribs; a cover plate made of translucent material resting on the prism surface; and an optical-waveguide plate on the smooth plate surfaces of the prism plate. The plates are curved continuously in the same direction of curvature, transversely to the longitudinal direction of the longitudinal ribs of the prism plate, at least over most of the plate width, with the longitudinal ribs being located on the inside of the arc of curvature of the prism plate. A reflector plate may be disposed over the waveguide plate, with a smooth or a longitudinally ribbed surface.

8 Claims, 4 Drawing Sheets

PLATE-TYPE LUMINAIRE

FIELD OF THE INVENTION

The invention relates to a plate-type luminaire of the type known from EP 1 106 905 A2.

SUMMARY OF THE INVENTION

It is an object of the invention to achieve better all-round glare suppression for a luminaire.

A further object of the invention is to improve the efficiency of illumination.

The plate-type luminaire of the invention is intended to be of straightforward or simple design and of inexpensive configuration.

These objects are achieved according to the invention which relates to a plate-type luminaire. It comprises a prism plate made of translucent material. The prism plate has a smooth plate surface on one side and a prism surface on the opposite side of the plate. The prism surface comprises a multiplicity of mutually parallel, longitudinal ribs, which extend in a longitudinal direction of the plate and are formed in the prism plate.

The luminaire also comprises a cover plate made of translucent material, which has a smooth plate surface on both opposite sides. The cover plate rests on the prism surface of the prism plate by one of the smooth plate surfaces of the cover plate.

The luminaire further comprises an optical-waveguide plate, which has a smooth plate surface on both sides. It rests on the smooth plate surface of the prism plate by one of the smooth plate surfaces of the waveguide plate. The optical-waveguide plate has at least one end surface which is designed for introducing light from a light source into the optical-waveguide plate.

The plates are designed for transmitting light from the optical-waveguide plate through the prism plate and, from the latter, through the cover plate into a space adjacent to the cover plate. Furthermore, the prism plate, the cover plate and the optical-waveguide plate are located one upon the other, and are all curved continuously over most of their plate width in the same direction of curvature, which is transverse to the longitudinal direction of the longitudinal ribs of the prism plate. The longitudinal ribs are located on the inside of the arc of curvature of the prism plate.

It has been surprisingly found that the invention provides for both better glare suppression and better illumination efficiency. The plate-type luminaire of the invention is of straightforward and simple design, inexpensive to produce and operationally reliable.

BRIEF DESCRIPTION OF THE DRAWINGS

The invention is described hereinbelow, by preferred embodiments as examples, with reference to the drawings, in which.

DESCRIPTION OF PREFERRED EMBODIMENTS

Figure 1:
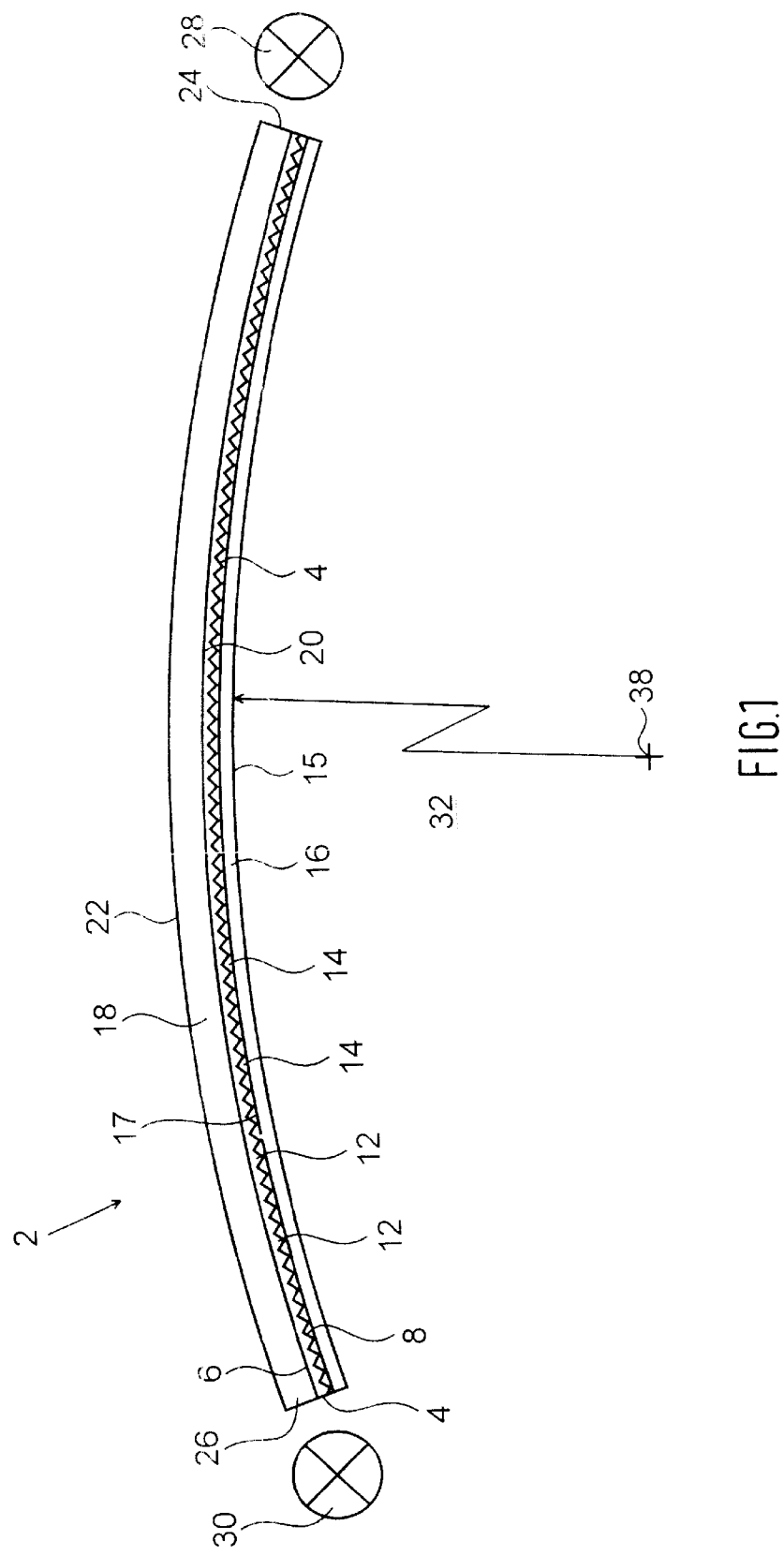
FIG. 1 shows an end view of a plate-type luminaire according to the invention viewed along plane I—I of FIG. 2, and in the arrow direction.
Figure 2:
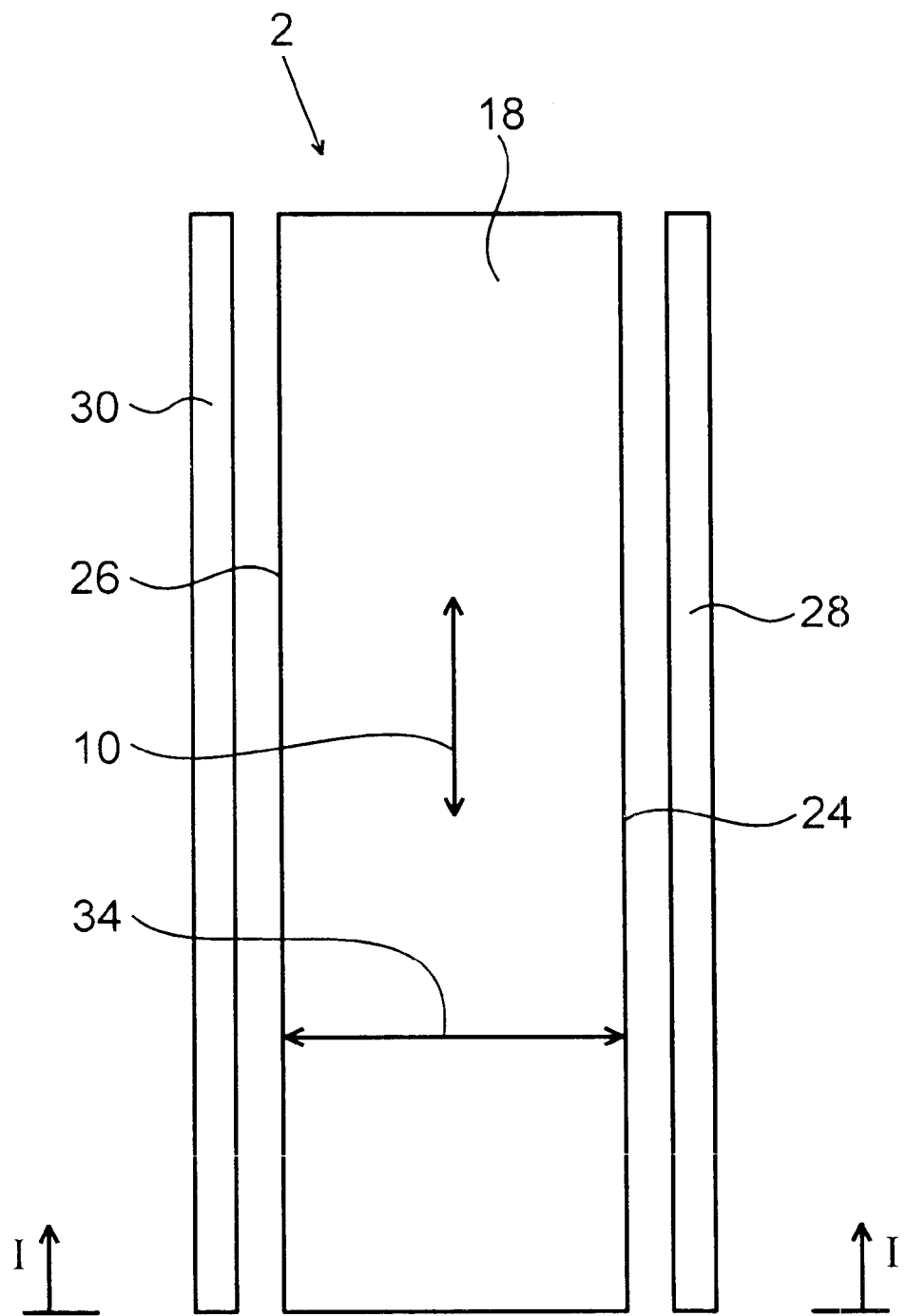
FIG. 2 shows a plan view of the plate-type luminaire of FIG. 1 on a reduced scale.

The plate-type luminaire 2 according to a first embodiment the invention, which is shown in FIG. 1, includes a prism plate 4 comprised of light transmitting, here translucent material. It has a smooth, here upper, plate surface 6 and a prism surface 8 on the opposite, here lower, side of the plate. The prism surface is formed by a multiplicity of mutually parallel, longitudinal ribs in the prism plate 4, which extend in a longitudinal direction 10 of the plate (FIG. 2). The longitudinal ribs 12 form longitudinal grooves 14 between the ribs. The longitudinal ribs 12 and the longitudinal grooves 14 together form sawteeth which run in the transverse direction of the plate. The teeth may have equal or unequal tooth flanks.

A cover plate 16 comprised of light transmitting, here translucent material has a smooth plate surface 15, 17 on both of its upper and lower sides. The cover plate rests on the prism surface 8 of the prism plate 4 by its upper smooth surface 17.

An optical-waveguide plate 18, also comprised of light transmitting, here translucent material has a smooth plate surface 20, 22 on both upper and lower sides respectively, rests on the smooth plate surface 6 of the prism plate 4 by the lower smooth plate surface 20. The plate 18 has at least one end surface 24 and/or 26 which is designed for introducing light from a respective light source 28 and/or 30 into the optical-waveguide plate 18. The at least one end surface 24 and/or 26 is preferably a longitudinally extending end surface which runs parallel to the longitudinal ribs 12 of the prism surface 8 of the prism plate 4. The embodiment in FIG. 1 contains two opposite end surfaces 24, 26. Opposite each end surface, there is one respective light source 28, 30 extending along the two longitudinal sides. The light source may be a fluorescent lamp, an incandescent lamp or some other known lighting means.

The plates 4, 16 and 18 are designed for transmitting light from the optical-waveguide plate 18, through the prism plate 4 and from there through the cover plate 16 into a space 32 adjacent the cover plate 16.

Each of the prism plate 4, the cover plate 16 and the optical-waveguide plate 18 butt against the neighboring plate(s) over their entire width. The plates are all curved continuously in the same direction of curvature, which is transversely to the longitudinal direction of the longitudinal ribs 12 of the prism plate 4, over most of their width. The longitudinal ribs 12 are located on the inside of the arc of curvature of the prism plate 4.

FIG. 2 shows each of the longitudinal direction 10 and the transverse direction 34 of the plate-type luminaire by double head arrows.

The invention provides for better glare suppression and better illumination efficiency.

According to the preferred embodiments of the invention, the plate combination 4, 16, 18 is curved continuously in the same direction of curvature, which is transversely to the longitudinal direction of the longitudinal ribs 12, over its entire width. The curvature may extend over a number of different radii of curvature. According to the preferred embodiments, however, the curvature of the plate combination 4, 16, 18 only extends about a single axis of curvature 38 as the center point of curvature.

The prism plate 4, the cover plate 16 and the optical-waveguide plate 18 are each comprised of glass or plastic. The material is preferably a clear material (in contrast to a matte material). Colored, translucent plastics or types of glass for producing colored light are also possible alternatives.

Figure 3:
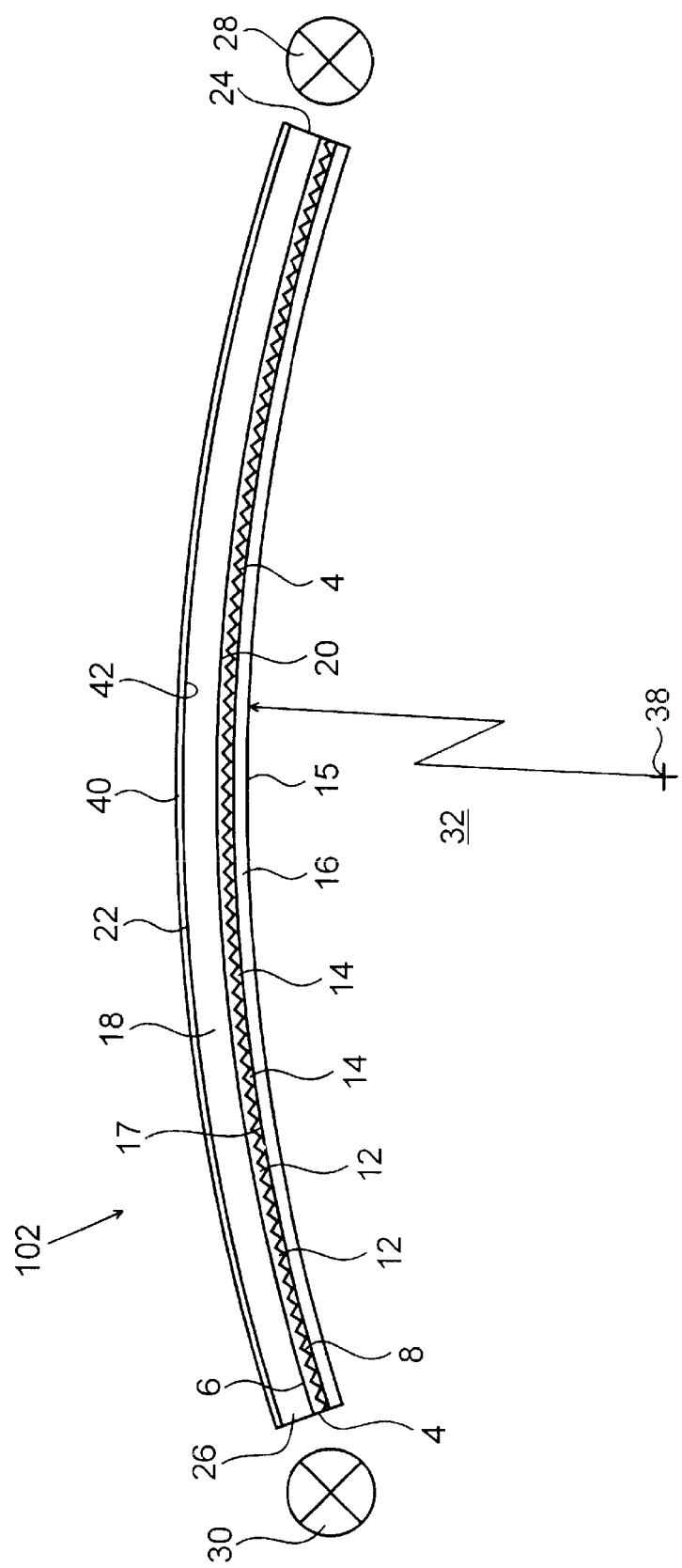
FIG. 3 shows an end view of a further embodiment of the invention as seen in the direction of plane I—I of FIG. 2.
Figure 4:
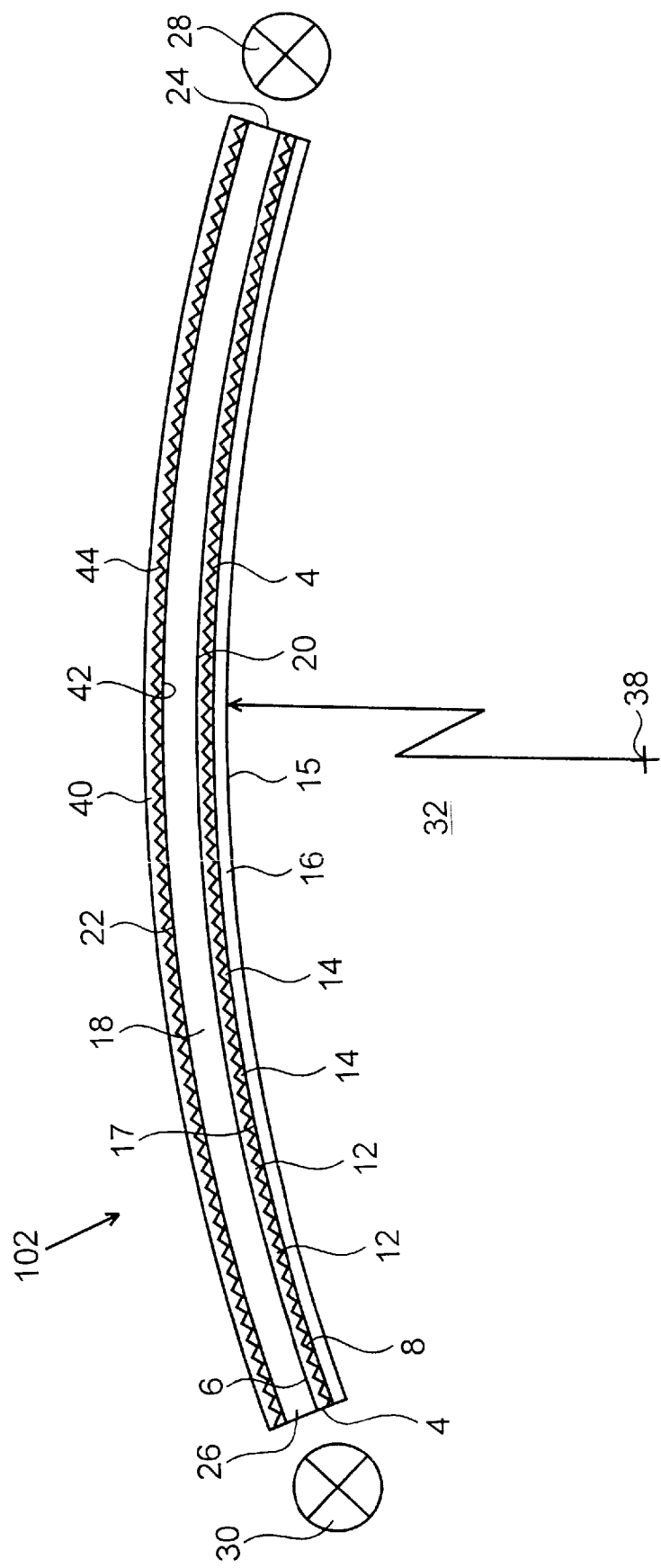
FIG. 4 shows an end view of yet another embodiment of the invention as seen in the direction of plane I—I from FIG. 2.

The embodiments of FIGS. 3 and 4 contain the same parts as the embodiment of FIG. 1. These parts are thus provided with the same designations and are not described again. The optical-waveguide plate 102 of FIG. 3 additionally contains a reflector plate 40 which rests on the smooth upper surface 22 of the optical-waveguide plate 18, which is the plate surface directed away from the prism plate 4, and the plate 40 is adapted to the curvature of the plate 18.

The plate surface 42 of the reflector plate 40 is adjacent the optical-waveguide plate 18. The plate surface 42 may be smooth (FIG. 3) or profiled (FIG. 4), matte, glossy or highly glossy. In the profiled design of the plate surface 42 of the reflector plate 40 in FIG. 4, the profiled plate surface is adjacent the optical-waveguide plate 18. The profiling is preferably formed by longitudinal ribs 44 which are formed in the reflector plate 40 and run parallel to the longitudinal ribs 12 of the prism plate 4, as FIG. 4 shows.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A plate-type luminaire, comprising:

a prism plate of light transmitting material, the prism plate having a smooth front plate surface and having an opposite second prism surface, the second prism surface comprising a plurality of parallel longitudinally extending ribs alternating with and defining grooves between adjacent ribs, and the ribs extending in a longitudinal direction along the plate;

a cover plate comprised of light transmitting material and having a smooth third plate surface resting on the second prism surface of the prism plate, the cover plate having an opposite fourth surface away from the prism plate;

an optical-waveguide plate of light transmitting material and having a fifth surface shaped to the smooth first surface of the prism plate and resting on the smooth first surface of the prism plate and having an opposite sixth surface away from the prism plate;

the optical-waveguide plate having an end surface at an edge thereof adapted for enabling introduction of light into the optical waveguide plate; all of the prism plate, cover plate and optical waveguide plates are adapted for transmitting light from the optical waveguide plate, through the prism plate and from the prism plate through the cover plate and into a space outside the fourth surface of the cover plate;

the prism plate, the cover plate and the optical waveguide plate are located respectively above one another with respective surfaces resting on each other; the plates all being continuously curved in the same direction of curvature and transversely to the longitudinal direction of the longitudinal ribs on the prism plate and over most of the widths of the plates, wherein the longitudinal ribs on the prism plate are located on the inside of the arc of curvature of the prism plate.

2. The luminaire of claim 1, wherein all of the prism plate, the cover plate and the optical waveguide plate are continuously curved in the same direction of curvature which is transverse to the longitudinal direction of the longitudinal ribs of the prism plate and over the entire plate width.

3. The luminaire of claim 2, wherein the entire curvature of the plates extends about a single axis of curvature as a center point of curvature.

4. The luminaire of claim 1, further comprising a reflector plate resting on the sixth side of the optical waveguide plate away from the prism plate and the reflector plate being curved to the curvature of the sixth surface of the optical waveguide plate to rest thereon.

5. The luminaire of claim 4, wherein the reflector plate has a seventh surface which rests on the sixth surface of the waveguide plate and the seventh surface of the light reflector plate is smooth.

6. The luminaire of claim 4, wherein the seventh light reflector plate surface is light reflective and rests on the sixth surface of the optical waveguide plate, and the light reflector plate seventh surface has a profile with a plurality of profile surfaces arranged obliquely in relation to one another.

7. The luminaire of claim 6, wherein the seventh reflector plate surface has a plurality of mutually parallel longitudinal ribs which profile the light reflecting plate surface and the ribs have side surfaces which are arranged obliquely in relation to one another, and the longitudinal ribs on the light reflecting plate surface run parallel to the longitudinal ribs of the prism plate.

8. The luminaire of claim 1, further comprising a light source opposed to the end surface of the optical waveguide plate.

* * * * *